United States Patent [19]

Ishida et al.

[11] Patent Number: 5,696,578

[45] Date of Patent: Dec. 9, 1997

[54] FREQUENCY TRACKING METHOD AND APPARATUS, AND DOPPLER VELOCITY METER USING THE SAME

[75] Inventors: Yasuhiko Ishida, Tokyo; Hidejiro Kadowaki, Yokohama; Makoto Takamiya, Tokyo; Jun Ashiwa, Yokohama; Shigeki Kato, Tokyo; Shinji Ueda, Yokohama, all of Japan

[73] Assignee: Canon Kabushiki Kaisha, Tokyo, Japan

[21] Appl. No.: 60,533

[22] Filed: May 13, 1993

[30] Foreign Application Priority Data

May 15, 1992 [JP] Japan ................................ 4-123606
Dec. 24, 1992 [JP] Japan ................................ 4-359143

[51] Int. Cl.$^6$ .............................. G01P 3/36; H03B 1/00
[52] U.S. Cl. ................................. 356/28.5; 327/557
[58] Field of Search ....................... 307/521; 356/28.5; 328/167; 327/553, 556, 557; 455/307

[56] References Cited

U.S. PATENT DOCUMENTS

| | | |
|---|---|---|
| 3,714,588 | 1/1973 | Deboo et al. |
| 4,101,837 | 7/1978 | Clayton et al. |
| 4,154,669 | 5/1979 | Goetz ................................ 356/28.5 |
| 4,307,398 | 12/1981 | Ward ................................ 328/133 |
| 4,610,540 | 9/1986 | Mossey ............................ 356/28.5 |
| 5,300,838 | 4/1994 | Elizondo ......................... 307/521 |

*Primary Examiner*—Stephen C. Buczinski
*Attorney, Agent, or Firm*—Fitzpatrick, Cella, Harper & Scinto

[57] ABSTRACT

This invention has as its object to provide a frequency tracking method, a frequency control apparatus (tracking apparatus) using this method, and a Doppler velocity meter using the same, which easily and quickly allow the center frequency of a band pass filter to coincide with the frequency of an input signal even when an input signal suffers from a large level drift. A tracking method for a center frequency of a band-pass filter relates to a method including the deviation information detection step of detecting deviation information of the frequency of a signal to be input to the band-pass filter or a signal output from the band-pass filter with respect to the center frequency of the band-pass filter, the deviation information detection step including at least the step of detecting the deviation direction, and the changing step of changing the center frequency of the band-pass filter on the basis of a detection result in the detection step of detecting the deviation information including the deviation direction, thereby adjusting the center frequency of the band-pass filter to coincide with the frequency of a signal to be filtered through the band-pass filter.

8 Claims, 10 Drawing Sheets

F I G. 3
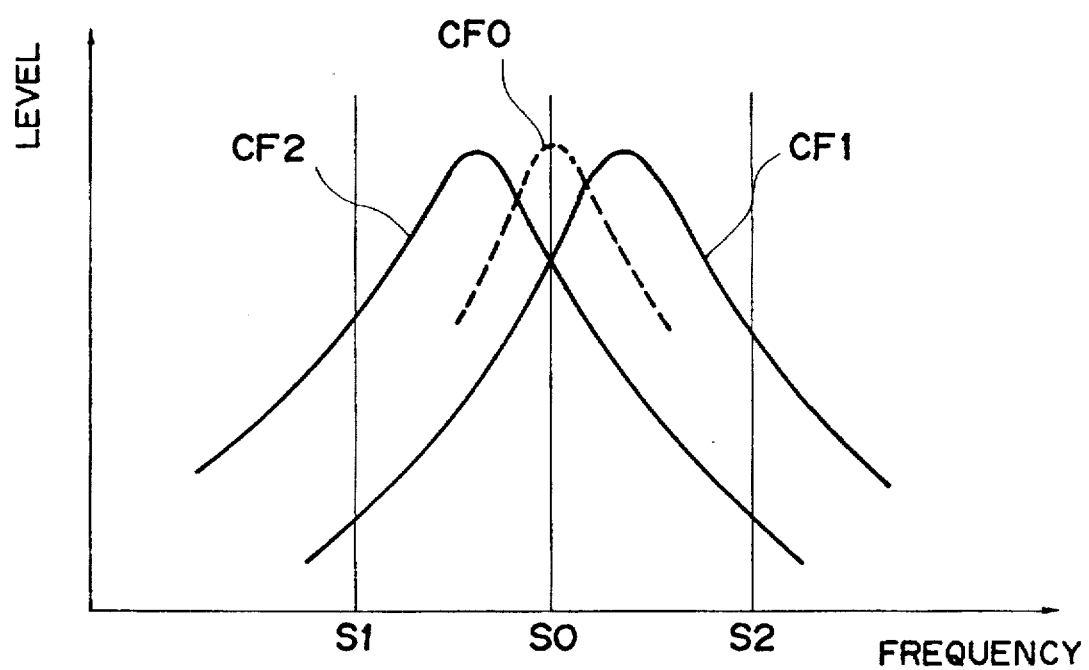
FREQUENCY CHARACTERISTIC OF BPF

FREQUENCY TRACKING METHOD AND APPARATUS, AND DOPPLER VELOCITY METER USING THE SAME

BACKGROUND OF THE INVENTION

1. Field of the Invention

The present invention relates to a frequency detection apparatus for detecting the relationship between the frequency of an input signal and the center frequency of a band-pass filter, and a method of causing the center frequency of the band-pass filter to track the frequency of the input signal. The present invention can be suitably applied to automatic center frequency tracking of a band-pass filter (to be abbreviated to a BPF hereinafter) with respect to an input signal in signal processing of a velocity meter for measuring a velocity by converting the velocity of a moving body into a frequency of an electrical signal, in particular, a laser Doppler velocity meter (to be abbreviated to an LDV hereinafter). At the same time, the present invention relates to a Doppler velocity meter using the same.

2. Related Background Art

In signal processing of an LDV, since an input signal has a poor S/N ratio, noise components of the signal must be cut through a BPF. However, since the frequency of the input signal changes according to the velocity of a moving body, especially when a change in velocity of the moving body is large, the center frequency of the internal BPF must be changed accordingly. In order to cause the center frequency of the BPF to automatically track the frequency of the input signal, the center frequency of the BPF is scanned from a lower frequency to a higher frequency or vice versa independently of the frequency deviation to search a position where the most satisfactory signal can be obtained, thereby adjusting the center frequency to coincide with that of the input signal.

However, the method of searching the frequency of the input signal by scanning the center frequency of the BPF from a lower frequency to a higher frequency or vice versa requires much time to cause the center frequency of the BPF to coincide with the frequency of the input signal. Since an input signal suffering from a large level drift makes it difficult to determine a satisfactory signal, it is more difficult to cause the center frequency to coincide with the frequency of the input signal by searching the frequency.

SUMMARY OF THE INVENTION

The present invention has been made in consideration of the conventional problems, and has as its object to provide a frequency tracking method, a frequency control apparatus (tracking apparatus), and a Doppler velocity meter using the same, which easily and quickly allow the center frequency of a BPF to coincide with the frequency of an input signal even when an input signal suffers from a large level drift.

BRIEF DESCRIPTION OF THE DRAWINGS

FIG. 3 is a graph for explaining the characteristics of filters and frequency deviation detection;

DESCRIPTION OF THE PREFERRED EMBODIMENTS

Figure 1:
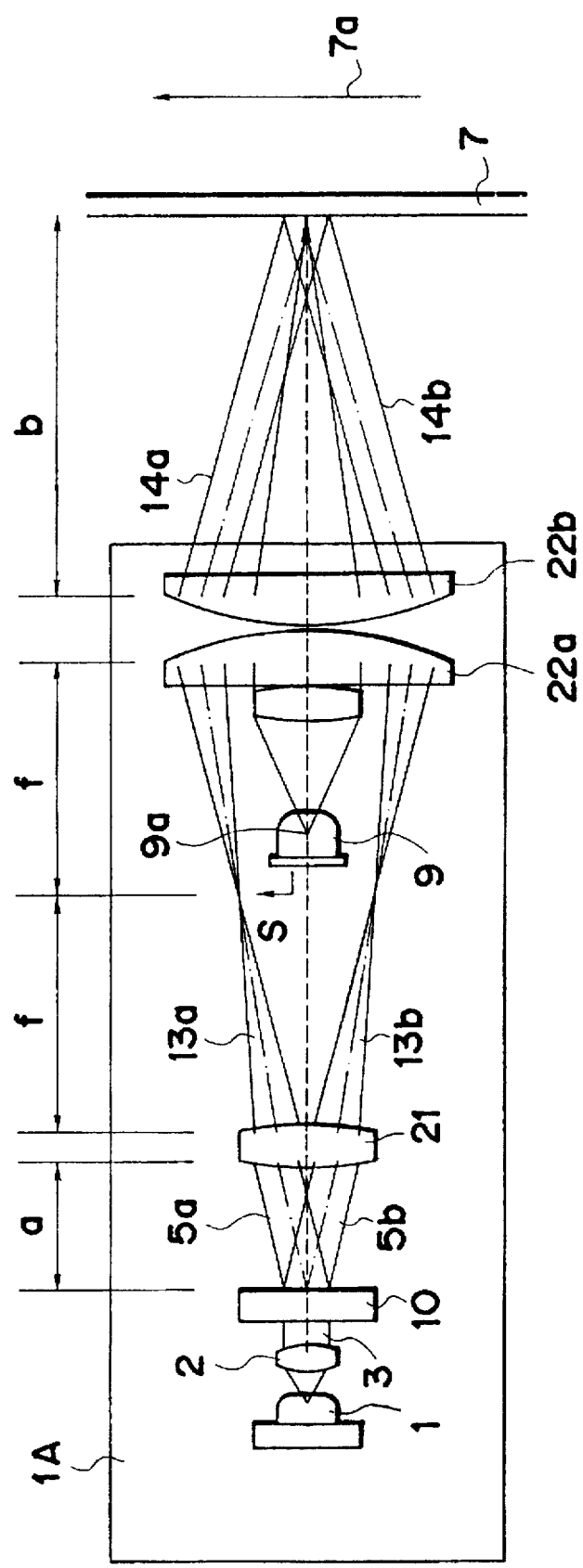
FIG. 1 is a view showing an arrangement of an optical system of an LDV according to the first embodiment of the present invention.

A frequency detection apparatus according to an embodiment to be described below comprises at least two BPFs, having center frequencies slightly shifted from each other, for receiving a signal to be detected, a center frequency changing means for simultaneously changing the center frequencies of the two BPFs while maintaining a predetermined relationship therebetween, and a detection means for detecting that the center frequencies of the two BPFs and the frequency of the signal satisfy a predetermined relationship by comparing the outputs from the two BPFs while the center frequencies are being changed by the frequency changing means.

A frequency tracking method of this embodiment is a method of changing the center frequency of a signal BPF in correspondence with the frequency of an input signal, wherein the input signal is input to one or a plurality of detection BPFs having center frequencies shifted from the center frequency of the signal BPF, a frequency deviation from the frequency of the input signal is detected by comparing outputs from at least two of the one or plurality of detection BPFs and the signal BPF, and the center frequency of the signal BPF is changed in accordance with the frequency of the input signal by simultaneously changing the center frequencies of the one or plurality of detection BPFs and the signal BPF to have a predetermined relationship therebetween while executing the detection.

Also, a frequency tracking method of this embodiment is a method of changing the center frequency of a signal BPF in correspondence with the frequency of an input signal, wherein the input signal is input to at least two detection BPFs having center frequencies shifted to be higher and lower than the center frequency of the signal BPF, and the center frequency of the signal BPF is changed in accordance with the frequency of the input signal by simultaneously changing the center frequencies of the two detection BPFs and the signal BPF, so that the output levels of the two detection BPFs become almost equal to each other.

Furthermore, a Doppler velocity meter of this embodiment comprises a first detection means for detecting light reflected by an object to be detected irradiated with a velocity measurement light beam, and generating a Doppler signal corresponding to the velocity of the object, a signal BPF for filtering the Doppler signal, one or a plurality of detection BPFs which receive the input signal, and have center frequencies shifted from the center frequency of the signal BPF, a second detection means for detecting a frequency deviation from the frequency of the input signal by comparing output signals from at least two of the one or plurality of detection BPFs and the signal BPF, a center frequency changing means for changing the center frequency of the signal BPF in accordance with the frequency of the input signal by simultaneously changing the center frequencies of the one or plurality of detection BPFs and the signal BPF to have a predetermined relationship therebetween in accordance with the detection result from the second detection means, and an output section for generating an output signal according to the velocity of the object on the basis of the output from the signal BPF.

The first embodiment of the present invention will be described below with reference to the accompanying drawings.

FIG. 1 is a schematic view showing main part of an optical system of an LDV according to the first embodiment of the present invention. FIG. 1 illustrates an LDV main body 1A, and an object 7 to be measured. The LDV main body 1A includes a laser diode 1, a collimator lens 2, a diffraction grating 10, a double-convex lens 21 having a curvature of 15.57 mm and a thickness of 3.6 mm, and plano-convex lenses 22a and 22b each having a curvature of 15.57 mm and a thickness of 5.6 mm. A focal length f of each of the double-convex lens and the plano-convex lenses is about 15 mm. Distances a and b satisfy a+b=2 f. The distance a is set to be about 10 mm to increase the working distance b, and the working distance b is set to be about 20 mm. The LDV main body 1A also includes a focusing lens 8 and a photodetector 9. Also, in FIG. 1, the velocity measurement direction of the object is indicated by an arrow 7a.

A laser beam 3 emitted from the laser diode 1 is strictly collimated by the collimator lens 2. A laser beam emitted from the laser diode 1 and having a wavelength λ of about 0.68 μm is collimated into the parallel beam 3 having a beam diameter size of 1.2 mm by the collimator lens 2. The parallel beam 3 is incident on the transmission type diffraction grating 10 having a grating pitch of 3.2 μm in a direction perpendicular to the grating alignment direction, thereby outgoing ±1st-order diffracted light beams 5a and 5b at a diffraction angle θ=12°. When the light beams 5a and 5b are incident on the double-convex lens 21 having the focal length f, light beams 13a and 13b shown in FIG. 1 are obtained. When the light beams 13a and 13b are incident on the plano-convex lenses 22a and 22b separated by 2 f from the double-convex lens 21, parallel beams 14a and 14b are obtained again, and are radiated onto the object 7 as beam spots each having a spot diameter size of 1.2 mm at an angle equal to the diffraction angle θ from the diffraction grating. Scattered light from the object 7 is efficiently focused onto a light-receiving unit 9a of the photodetector 9 via the plano-convex lenses 22a and 22b and the focusing lens 8. Then, the photodetector 9 outputs an output signal S including a Doppler signal given by equation (1):

$$F=2V/d \qquad (1)$$

If the wavelength λ of the laser diode 1 changes, θ drifts in correspondence with dsinθ=λ, but the Doppler signal does not drift. In this apparatus, the two beam spots can be fixed in position. More specifically, when the object 7 is set at a position shown in FIG. 1, since the positions of the two beam spots on the object are fixed, no position deviation between the spots occurs, and the two beam spots can maintain a proper crossing state.

Also, since a<b, b becomes relatively long, and a long working distance can be set to increase the degree of freedom in velocity meter arrangement.

Figure 2A:
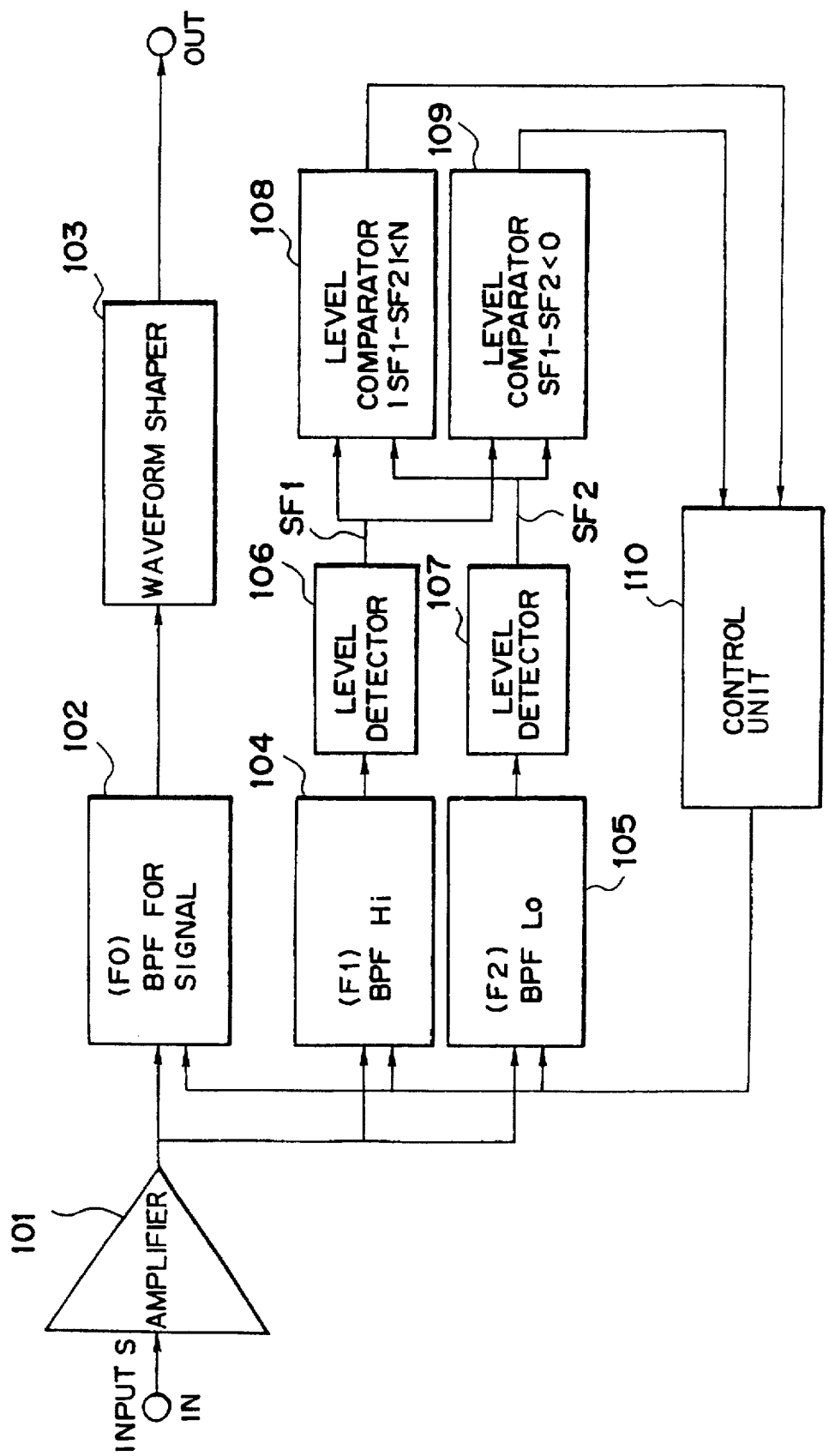
FIG. 2A is a block diagram showing a signal processing system of the first embodiment.

FIG. 2A is a block diagram showing a signal processing system of the apparatus of this embodiment.

In FIG. 2A, an input signal S obtained by converting the velocity of a moving object into an electrical frequency is amplified by an amplifier 101, and is then input to three filters, i.e., a signal BPF 102 (center frequency F0), a high-frequency BPF 104 (center frequency F1), and a low-frequency BPF 105 (center frequency F2) (in this case, F1/F0=F0/F2). A signal filtered through the signal BPF 102 is processed by a waveform shaper 103, and is output as a rectangular wave signal. This output signal is supplied to an external computer (not shown) to calculate the velocity of the object 7. Signals filtered through the BPFs 104 and 105 are respectively input to level detectors 106 and 107. These signals are converted by the level detectors 106 and 107 into signals $S_{F1}$ and $S_{F2}$ indicating the levels (amplitude values) of the received signals, and a level comparator 108 compares the signals $S_{F1}$ and $S_{F2}$ to check if $|S_{F1}-S_{F2}|<N$. The level comparator 108 outputs a signal indicating the comparison result to a control unit 110. If the absolute value of the level difference between the signals $S_{F1}$ and $S_{F2}$ is not larger than a predetermined allowable value N, it is determined that the center frequency of the signal BPF 102 coincides with the frequency of the input signal S; in the other hand, if it is larger than the N, it is determined that the center frequency of the signal BPF 102 is deviated from the frequency of the input signal S. A level comparator 109 makes comparison to check if $S_{F1}-S_{F2}<0$ and outputs a signal indicating the comparison result to the control unit 110. If $S_{F2}$ is larger than $S_{F1}$, it is determined that the center frequency of the signal BPF 102 is deviated to the high-frequency side with respect to the frequency of the input signal S; in the other hand, if SF1 is larger than SF2, it is determined that the center frequency of the signal BPF 102 is deviated to the low-frequency side with respect to the frequency of the signal S. The control unit 110 simultaneously increases or decreases the center frequencies of the three BPFs 102, 104, and 105 on the basis of information from the level comparators 108 and 109 in a direction to correct the frequency deviation until a coincidence between the two frequencies of interest is detected, thereby executing frequency tracking. According to this processing, the center frequency of the BPF 102 can be caused to always coincide with the frequency of the signal S. In this case, the center frequencies are changed so that the ratios of the center frequencies of the three BPFs 102, 104, and 105 maintain predetermined values.

A frequency deviation detection method will be described below with reference to FIG. 3. FIG. 3 shows filtering frequency characteristics (indicated by CF0, CF1, and CF2) of the three BPFs 102, 104, and 105. The frequency (logarithmic indication) is plotted along the abscissa, and the relative value of the output level of a filtered signal is plotted along the ordinate. With the filters set with the center frequencies shown in FIG. 3, in the case of the input signal S having a frequency S0 (the frequencies F0 and S0 coincide with each other), since levels CF1 and CF2 are equal to each other, $|S_{F1}-S_{F2}|$ is almost zero. Therefore, the level comparator 108 generates an output indicating that $|S_{S1}-S_{F2}|$ is smaller than N. When the signal S has a frequency S1 at the low-frequency side, since the levels CF1 and CF2 have a large difference therebetween, and the level CF2 is always larger than the level CF1, the value $|S_{F1}-S_{F2}|$ exceeds the properly set value N, and a value $S_{F1}-S_{F2}$ becomes smaller than ZERO. Therefore, when the level comparator 108 outputs a signal indicating that $|S_{F1}-S_{F2}|$ is larger than N, and the level comparator 109 outputs a signal indicating that $S_{F1}-S_{F2}$ is smaller than ZERO, it can be detected that the center frequency F0 of the BPF 102 is shifted to the high-frequency side with respect to the signal S. Conversely, when the signal S has a frequency such as S2 at the high-frequency side, the levels CF1 and CF2 have a large difference therebetween, and the level CF1 is always larger than CF2. Therefore, when the level comparator 108 outputs a signal indicating that $|S_{F1}-S_{F2}|$ is larger than N, and the level comparator 109 outputs a signal indicating that $S_{F1}-S_{F2}$ is larger than ZERO, it can be detected that the center frequency F0 of the BPF 102 is shifted to the low-frequency side with respect to the signal S.

Figure 4:
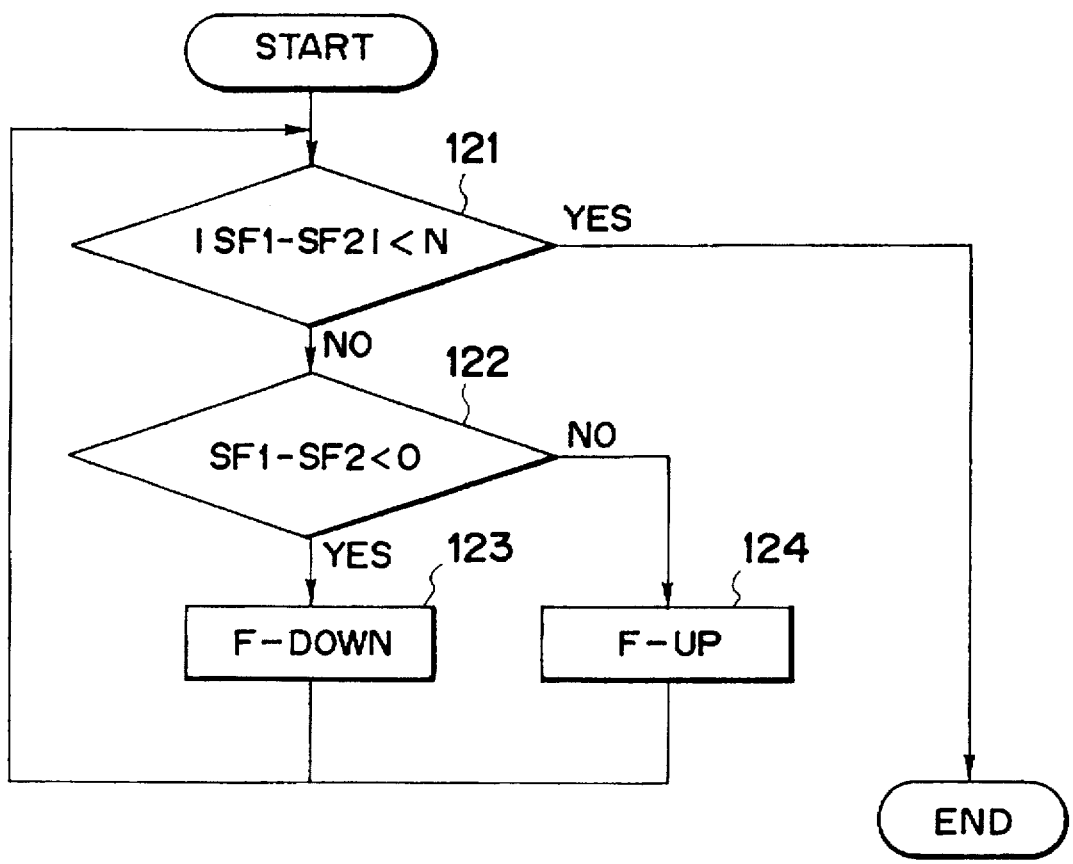
FIG. 4 is a flow chart showing automatic frequency tracking control.

FIG. 4 is a flow chart showing control of the automatic frequency tracking method. In level comparison step 121, it is checked if the absolute value of the level difference between $S_{F1}$ and $S_{F2}$ is larger than a predetermined value N. If the absolute value is not larger than the value N, the processing is ended. However, if the absolute value is larger than N, the flow advances to level comparison step 122 to compare the levels of $S_{F1}$ and $S_{F2}$. If $S_{F1}$ is smaller than $S_{F2}$, the flow advances to step 123 to decrease the center frequencies, and the flow returns to step 121. If $S_{F2}$ is smaller than $S_{F1}$, the flow advances to step 124 to increase the center frequencies, and the flow returns to step 121. These operations are repeated until the absolute value of the level difference between $S_{F1}$ and $S_{F2}$ becomes smaller than N. This control can be executed by either a software program using a CPU or a hardware arrangement using a logic circuit.

In the above embodiment, the center frequencies of the detection BPFs 104 and 105 are assigned at two sides of the center frequency of the signal BPF 102. Other BPFs may be arranged outside these center frequencies. An embodiment of such an arrangement will be described below.

Figure 5:
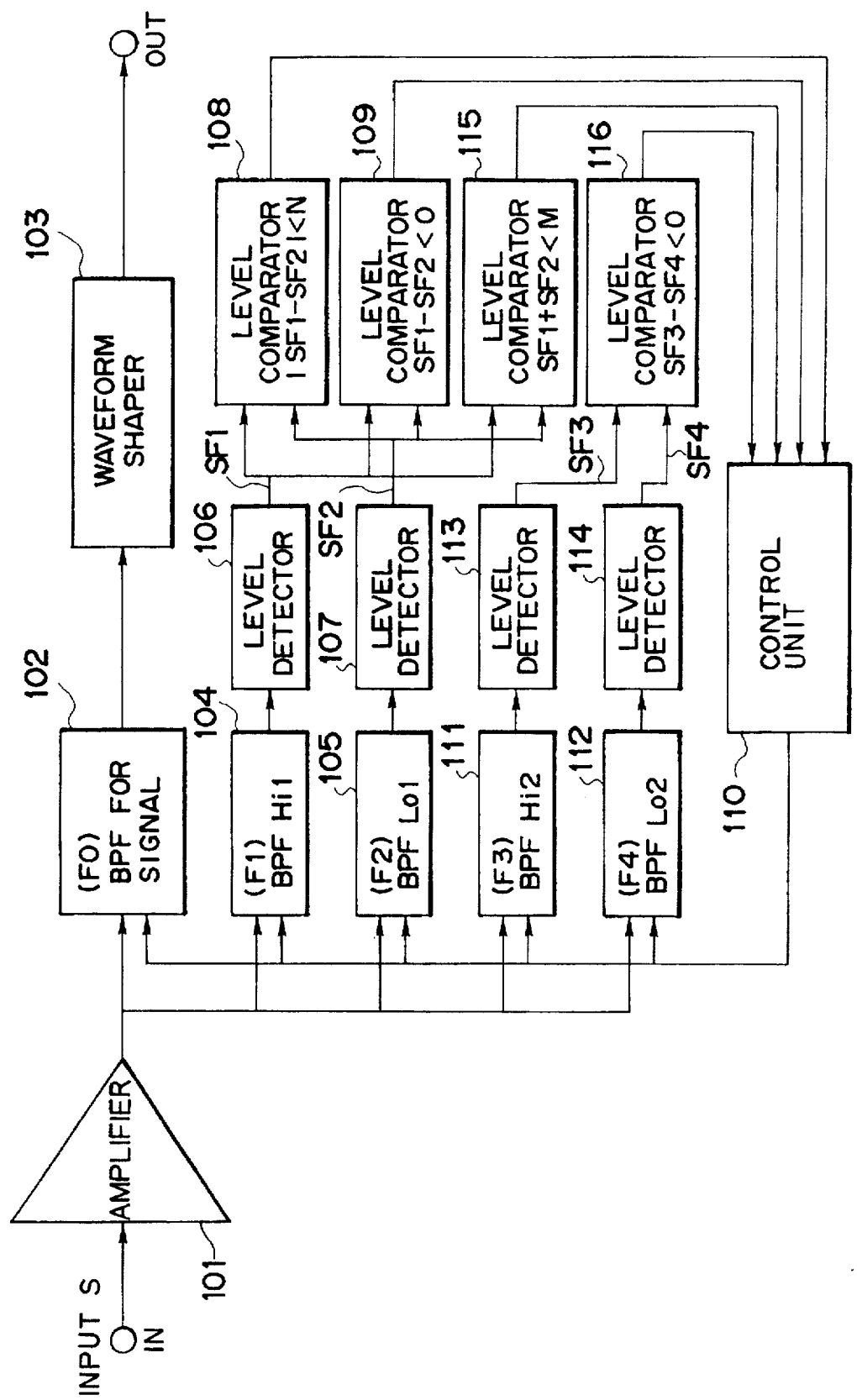
FIG. 5 is a block diagram showing a signal processing system according to the second embodiment of the present invention.
Figure 6:
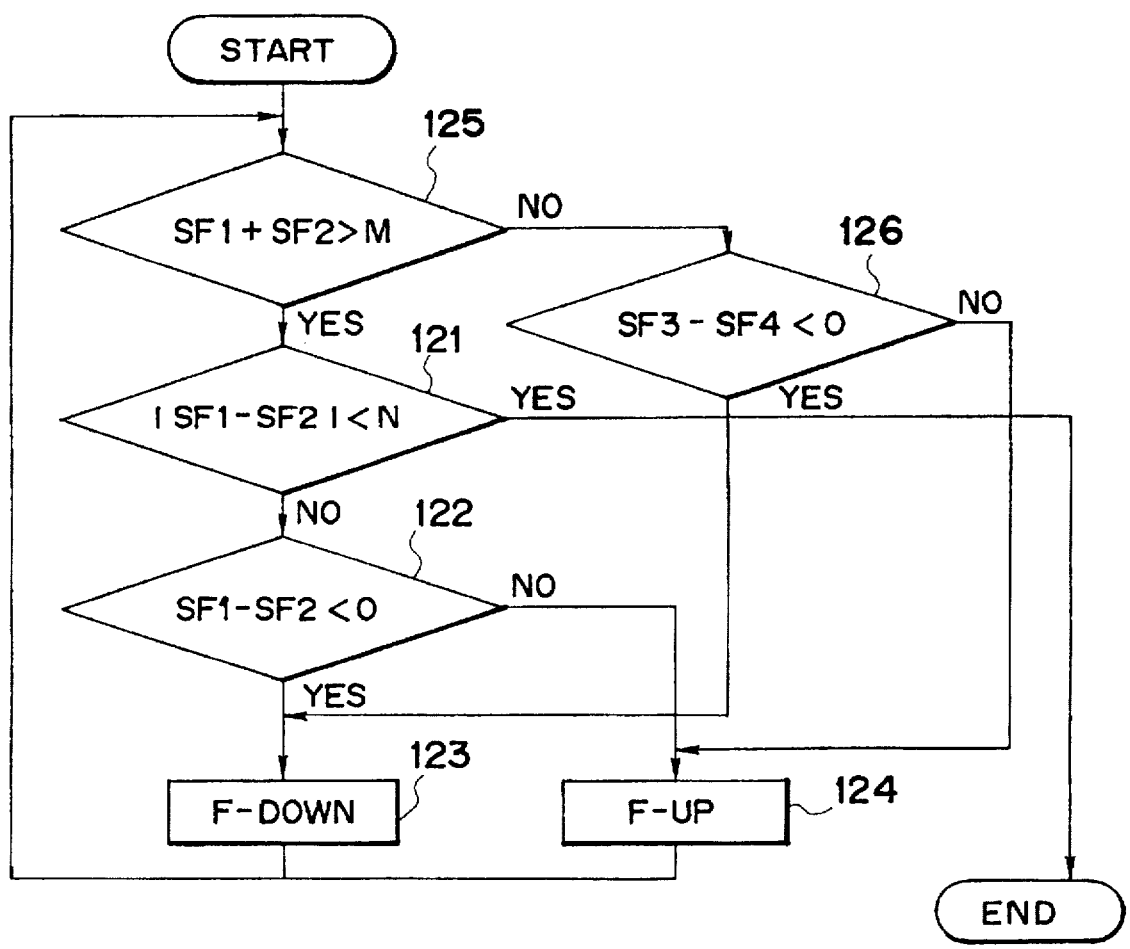
FIG. 6 is a flow chart showing automatic frequency tracking control in the apparatus shown in FIG. 5.

FIG. 5 is a block diagram showing an arrangement of a signal processing system according to the second embodiment of the present invention. The arrangement of an optical system, and the like is the same as that of the first embodiment, and the same reference numerals in FIG. 5 denote the same parts as in FIG. 2. A difference from the arrangement shown in FIG. 2 is that members 111 to 116 are added. That is, the system in FIG. 5 additionally includes a BPF 111 having a center frequency higher than that of the BPF 104, a BPF 112 having a center frequency lower than that of the BPF 105, level detectors 113 and 114 for detecting the output levels of the received signals, and level comparators 115 and 116. A control method of this signal processing system will be described below with reference to FIG. 6 showing the control flow chart of the control unit 110. In step 125, the control unit 110 receives the output from the level comparator 115, i.e., a comparison result indicating whether or not a sum of the levels $S_{F1}$ and $S_{F2}$ is larger than a predetermined value M. If the sum of the levels is larger than the predetermined value, the control unit 110 determines that the input signal can be processed using the BPFs 104 and 105 according to the flow chart shown in FIG. 4, and the flow advances to step 121. Steps 121, 122, 123, and 124 are the same those in the first embodiment. On the other hand, if the sum of the levels becomes smaller than the predetermined value M, the control unit 110 determines that it is hard to process the input signal using the BPFs 104 and 105 according to the flow chart shown in FIG. 4, and adjusts the center frequencies by comparing levels $S_{F3}$ and $S_{F4}$ of the outputs from the level detectors 113 and 114 in step 126. More specifically, the level comparator 116 transmits, to the control unit 110, a signal indicating whether or not $S_{F3}-S_{F4}$ is smaller than ZERO. If $S_{F3}-S_{F4}$ is smaller than ZERO, the flow advances to step 123 to decrease the center frequencies of the BPFs. On the other hand, if $S_{F3}-S_{F4}$ is larger than ZERO, the flow advances to step 124 to increase the each center frequency of the BPFs. These operations are repeated until the sum of the levels $S_{F1}$ and $S_{F2}$ becomes larger than the predetermined value M.

Figure 2B:
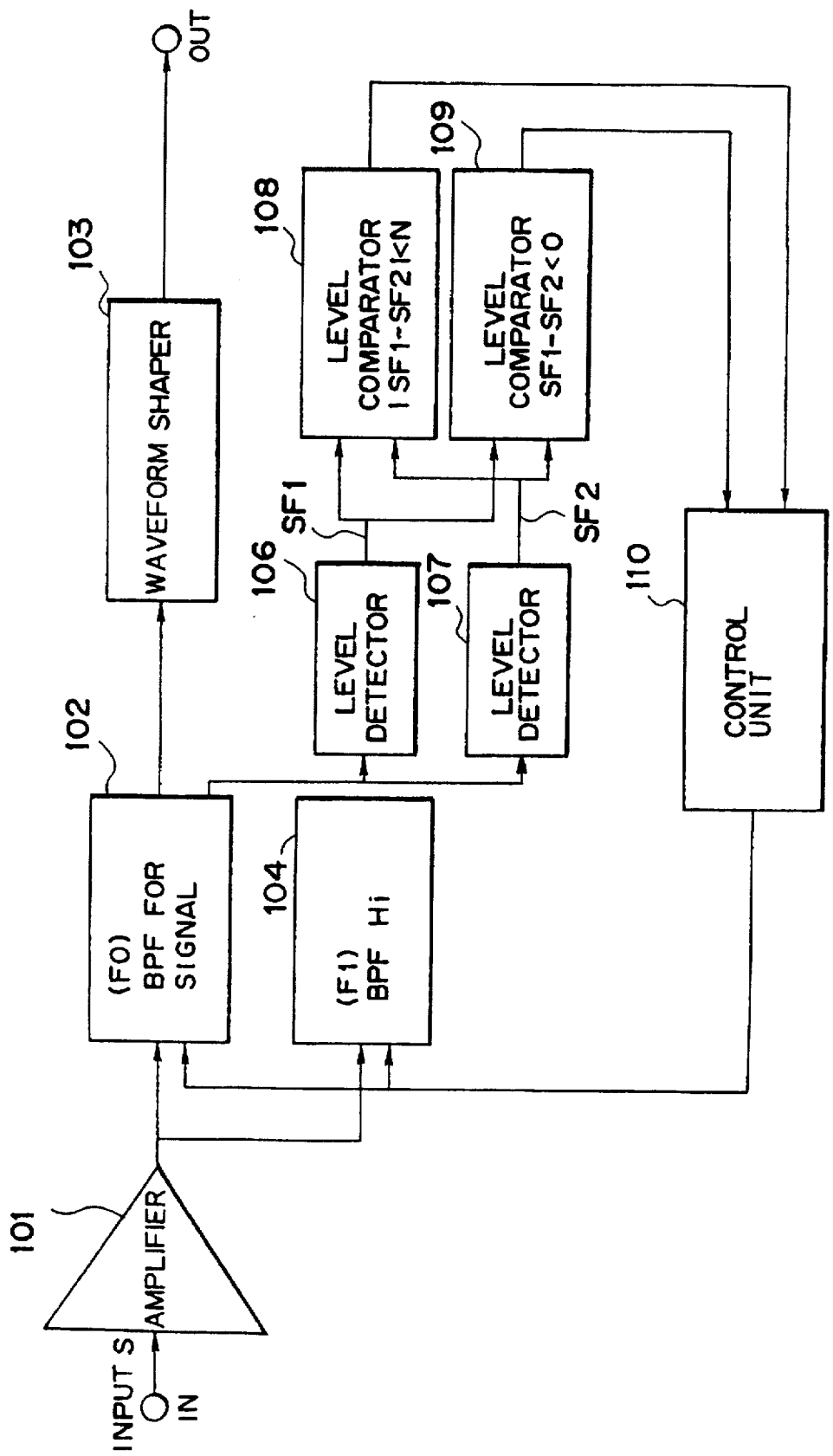
FIG. 2B is a block diagram showing a signal processing system for another embodiment.

As shown in FIG. 2B, for example, the number of detection BPFs may be decreased to one (e.g., the BPF 104 alone), the level detector 107 may receive a signal from the signal BPF instead, and control may be executed by comparison with the level of the output from the signal BPF. In this case, when the signal frequency becomes lower than the center frequency of the BPF 102, a value $S_{F1}-S_{F2}$ becomes an almost constant negative value regardless of the difference between the signal frequency and the center frequency of the BPF 102. Thus, the level comparator 109 may adopt a value, an absolute value of which is slightly smaller than that of the constant negative value (e.g., L<0), as a comparison reference value in place of 0, and may transmit a comparison result signal indicating if $S_{F1}-S_{F2}<L$ to the control unit 110. Also, the level comparator 108 may transmit a comparison result indicating if $|S_{F1}-S_{F2}-L|<N$ to the control unit 110. The control unit executes the above-mentioned center frequency control of the BPFs on the basis of these comparison results. In this case, even when the signal frequency cannot completely coincide with the center frequency of the BPF 102, the center frequency can be adjusted to a frequency almost coinciding with the signal frequency.

As described above, according to each of the above embodiments, since the magnitude and direction of a deviation between the frequency of the input signal and the center frequency of the signal BPF can be detected at the same time, high-speed frequency tracking can be achieved. In addition, since the levels of outputs from two filters are compared, a frequency deviation can be reliably detected even when the signal level changes.

In a frequency tracking method of an embodiment to be described below, the frequency of a signal filtered through a BPF is detected, and the center frequency of the BPF is changed according to the detected frequency, so that the center frequency of the BPF is changed according to the frequency of the input signal input to the BPF. In this manner, the frequency of the input signal and the center frequency of the BPF can be caused to easily and quickly coincide with each other.

A Doppler velocity meter of this embodiment comprises a signal generation means for detecting light reflected by an object to be detected irradiated with a velocity measurement light beam, and generating a Doppler signal according to the velocity of the object, a BPF for receiving the Doppler signal and capable of changing a center frequency thereof, a frequency detection means for detecting a frequency of the signal filtered through the BPF, a control means for changing the center frequency of the BPF according to the detected frequency, and an output means for generating an output signal corresponding to the velocity of the object on the basis of the output from the BPF. Thus, a simple and precise velocity meter can be realized.

The third embodiment of the present invention will be described below with reference to the drawings.

Figure 7:
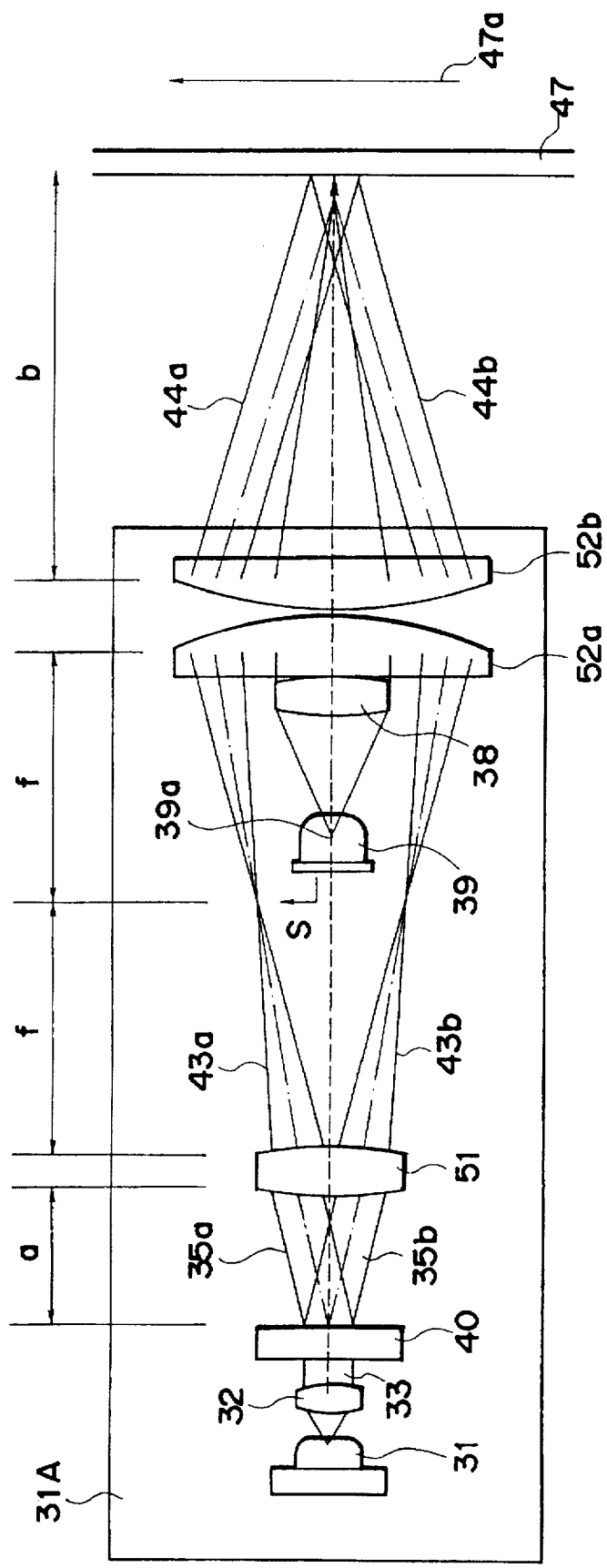
FIG. 7 is a view showing an arrangement of an optical system of an LDV according to the third embodiment of the present invention.

FIG. 7 is a schematic view showing main part of an optical system of an LDV according to the third embodiment of the present invention. FIG. 7 illustrates an LDV main body 31A, and an object 37 to be measured. The LDV main body 31A includes a laser diode 31, a collimator lens 32, a diffraction grating 40, a double-convex lens 51 having a curvature of 15.57 mm and a thickness of 3.6 mm, and plano-convex lenses 52a and 52b each having a curvature of 15.57 mm and a thickness of 5.6 mm. A focal length f of each of the double-convex lens and the plano-convex lenses is about 15 mm.

Distances a and b satisfy a+b=2 f. The distance a is set to be about 10 mm to increase the working distance b, and the working distance b is set to be about 20 mm. The LDV main body 31A also includes a focusing lens 38 and a photodetector 39. Also, in FIG. 7, the velocity measurement direction of the object is indicated by an arrow 37a.

A laser beam 33 emitted from the laser diode 31 is strictly collimated by the collimator lens 32. A laser beam emitted from the laser diode 31 and having a wavelength λ of about 0.68 μm is collimated into the parallel beam 33 having a beam diameter size of 1.2 mm by the collimator lens 32. The parallel beam 33 is incident on the transmission type diffraction grating 40 having a grating pitch of 3.2 μm in a direction perpendicular to the grating alignment direction, thereby outgoing ±1st-order diffracted light beams 35a and 35b at a diffraction angle θ=12°.

When the light beams 35a and 35b are incident on the double-convex lens 51 having the focal length f, light beams 43a and 43b shown in FIG. 7 are obtained. When the light beams 43a and 43b are incident on the plano-convex lenses 52a and 52b separated by 2 f from the double-convex lens 51, parallel beams 44a and 44b are obtained again, and are radiated onto the object 37 as beam spots each having a spot diameter size of 1.2 mm at an angle equal to the diffraction angle θ from the diffraction grating.

Scattered light from the object 37 is efficiently focused onto a light-receiving unit 39a of the photodetector 39 via the plano-convex lenses 52a and 52b and the focusing lens 38. Then, the photodetector 39 outputs an output signal S including a Doppler signal given by the above-mentioned equation (1):

$$F = 2V/d \quad (1)$$

If the wavelength λ of the laser diode 31 changes, θ drifts in correspondence with dsinθ=λ, but the Doppler signal does not drift. In this apparatus, the two beam spots can be fixed in position. More specifically, when the object 37 is set at a position shown in FIG. 7, since the positions of the two beam spots on the object are fixed, no position deviation between the spots occurs, and the two beam spots can always maintain a proper crossing state.

Also, since a<b, b becomes relatively long, and a long working distance can be set, thus increasing the degree of freedom in velocity meter arrangement.

Figure 8:
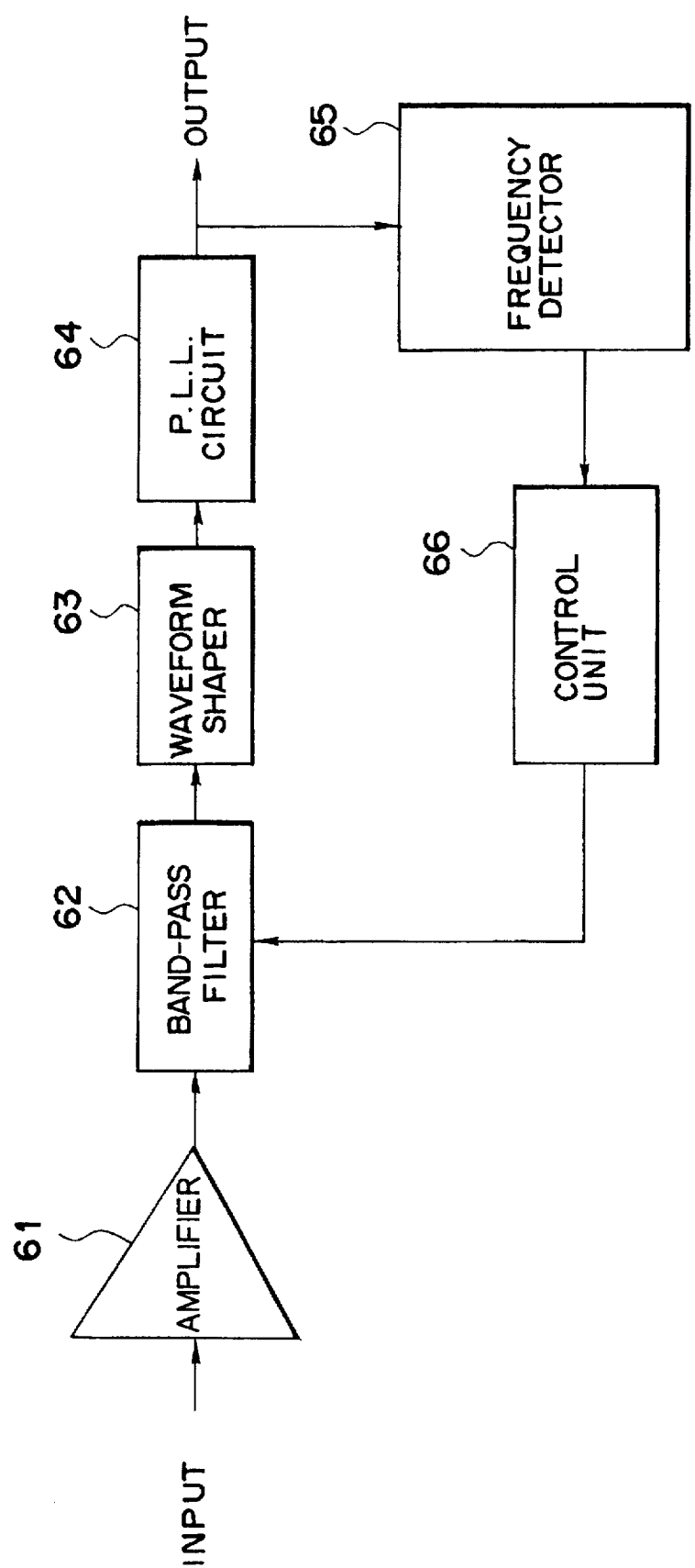
FIG. 8 is a block diagrams showing a frequency tracking apparatus of the third embodiment.

FIG. 8 is a block diagram showing a frequency tracking apparatus of the present invention. The apparatus shown in FIG. 8 includes an amplifier 61 for amplifying the input signal S from the photodetector 39, which signal is obtained by converting the velocity of a moving object into an electrical frequency, and a BPF 62 for receiving the amplified input signal S. The center frequency of the BPF 62 is variable.

The apparatus shown in FIG. 8 also includes a waveform shaper 63 for waveform-shaping the output signal from the BPF 62, and supplying the shaped signal to a P.L.L. circuit 64, a frequency detector 65 such as a frequency/voltage converter (to be referred to as an F/V converter hereinafter) for detecting the output frequency of the P.L.L. circuit 64, and outputting a voltage signal corresponding to the detected output frequency, and a control unit 66 for processing the voltage signal, and supplying, to the BPF 62, a control signal for adjusting the center frequency of the BPF 62 to coincide with the frequency of the input signal S. The output from the P.L.L. circuit 64 serves as a frequency signal for velocity measurement.

Figure 9:
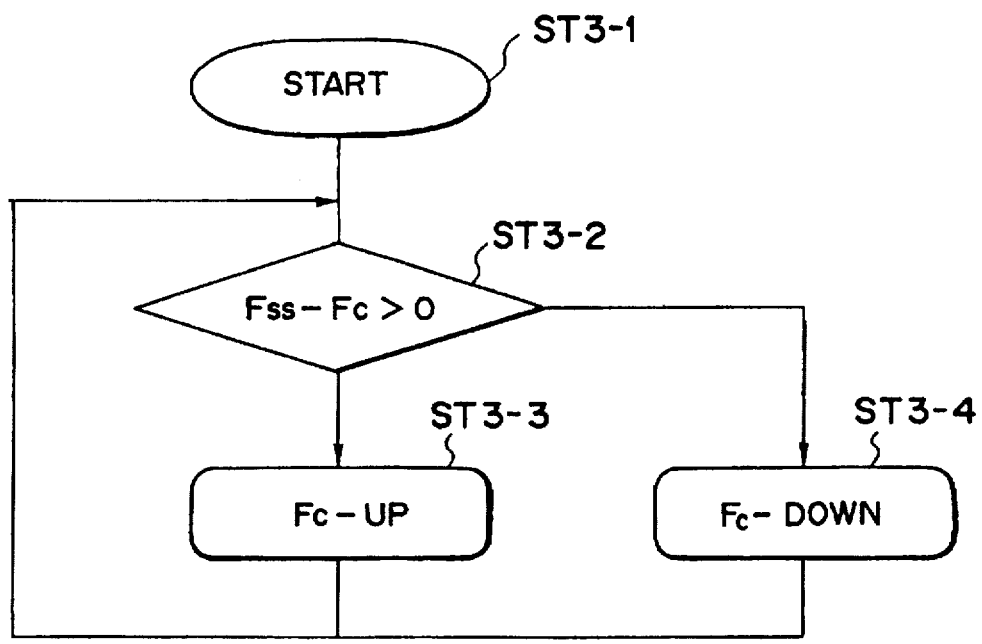
FIG. 9 is a flow chart for explaining a frequency tracking method of the third embodiment.

A frequency tracking method of the present invention will be described below with reference to the flow chart shown in FIG. 9. When an operation is started in step ST3-1, an input signal S (signal frequency $F_S$) is input to the amplifier 61, the BPF 62, the waveform shaper 63, and the P.L.L. circuit 64 in turn, and thereafter, its signal frequency $F_{SS}$ is detected using the frequency detector 65. In step ST3-2, the signal frequency $F_{SS}$ is compared with the center frequency $F_C$ of the BPF. If the signal frequency $F_{SS}$ is larger than the center frequency $F_C$, the control portion 66 increases the center frequency $F_C$ in step ST3-3, and the flow returns to step ST3-2; in the other hand, Fc is larger than the Fss, the control unit 66 decreases the center frequency $F_C$ in step ST3-4, and the flow returns to step ST3-2.

With this feedback control, the frequency $F_S$ of the input signal S and the center frequency $F_C$ of the BPF are caused to coincide with each other. This control is realized by a hardware arrangement alone.

Figure 10:
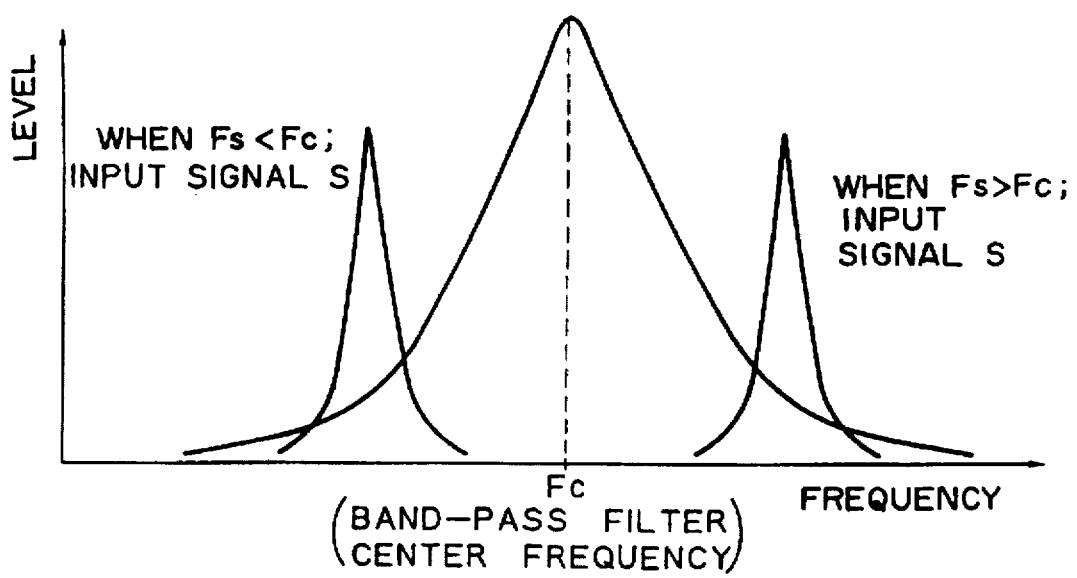
FIG. 10 is a graph for explaining the characteristics of filters and frequency deviation detection.

In FIG. 10, when $F_S > F_C$, if the input signal S is filtered through the BPF having the center frequency $F_C$, $F_S$ is frequency-shifted toward the $F_C$ side, i.e., the low-frequency side, and as a result, $F_{SS} < F_S$ is satisfied; when $F_S < F_C$, if the input signal S is filtered through the BPF having the center frequency $F_C$, $F_S$ is frequency-shifted toward the $F_C$ side, i.e., the high-frequency side, and as a result, $F_{SS} > F_S$ is satisfied. When $F_S$ and $F_C$ are caused to coincide with each other with the above-mentioned arrangement, a difference between the input frequency $F_S$ and the output signal frequency $F_{SS}$ can be prevented.

In this embodiment, the frequency detector 65 comprises the F/V converter. Also, in this embodiment, paying attention to the point that a rectangular wave signal is output from the P.L.L. circuit 64, the frequency detector 65 may comprise a frequency counter for counting this rectangular wave signal. In this case, since other arrangements and operations are the same as those in the embodiment shown in FIGS. 7 and 8, a repetitive description thereof will be avoided.

The control unit 66 may be realized by a software program using a CPU.

According to the frequency tracking method of the above-mentioned embodiment, since the center frequency of the BPF is changed according to the frequency of an input signal filtered through the BPF so as to cause it to coincide with the frequency of the input signal, the following effects can be expected.

(1) The number of circuit components is small, a hardware arrangement can be prevented from becoming large in size, and high-speed frequency tracking can be achieved.

(2) Since a simple arrangement including only one BPF is used, a frequency tracking range and a frequency tracking velocity can be easily set by changing the frequency characteristics of the BPF.

What is claimed is:

1. A tracking method for tracking a center frequency of a band-pass filter, comprising:

a deviation information detection step of detecting deviation information of a frequency of a signal to be input to the band-pass filter or a signal output from the band-pass filter with respect to the center frequency of the band-pass filter, the deviation information detection step including at least the step of detecting a deviation direction; and a changing step of changing the center frequency of the band-pass filter on the basis of a detection result in the detection step of detecting the deviation information including the deviation direction, thereby adjusting the center frequency of the band-pass filter to coincide with the frequency of a signal to be filtered through the band-pass filter, wherein the deviation information detection step includes the step of inputting the signal to be input to the band-pass filter to one or a plurality of detection band-pass filters having center frequencies different from the center frequency of the band-pass filter, and in the case where a number of detection band-pass filters is one, comparing output signals from the band-pass filter and the one detection band-pass filter, and in the case where the number of detection band-pass filters is plural, comparing output signals from at least two detection band-pass filters.

2. A method according to claim 1, wherein the changing step of changing the center frequency includes the step of simultaneously changing the center frequency of each of said band-pass filter and said one or plurality of detection band-pass filters while maintaining a predetermined relationship therebetween.

3. A method according to claim 1, wherein the deviation information detection step includes the step of inputting the signal to be input to said band-pass filter to two detection band-pass filters respectively having center frequencies higher and lower than the center frequency of said band-pass filter, and comparing output signals from said two detection band-pass filters.

4. A control apparatus for controlling a center frequency of a band-pass filter, comprising:

deviation information detection means for detecting deviation information of a frequency of a signal to be input to said band-pass filter or a signal output from said band-pass filter with respect to the center frequency of said band-pass filter, the deviation information including at least a deviation direction; and band-pass filter control means for changing the center frequency of said band-pass filter on the basis of a detection result of the deviation information including the deviation direction detected by said deviation information detection means, thereby adjusting the center frequency of said band-pass filter to coincide with the frequency of a signal to be filtered through said band-pass filter, wherein said deviation information detection means includes one or a plurality of detection band-pass filters having center frequencies different from the center frequency of said band-pass filter, and the deviation information is detected by inputting the signal to be input to said band-pass filter to said one or plurality of detection band-pass filters as well, and in the case where a number of detection band-pass filters is one, comparing output signals from said band-pass filter and said one detection band-pass filter, and in the case where the number of detection band-pass filters is plural, comparing output signals from at least two detection band-pass filters.

5. An apparatus according to claim 4, wherein said band-pass filter control means changes the center frequency by simultaneously changing the center frequencies of said band-pass filter and said one or plurality of detection band-pass filters while maintaining a predetermined relationship therebetween.

6. An apparatus according to claim 4, wherein said deviation information detection means includes two detection band-pass filters respectively having center frequencies higher and lower than the center frequency of said band-pass filter, and the deviation information is detected by inputting the signal to be input to said band-pass filter to said two detection band-pass filters as well, and comparing output signals from said two detection band-pass filters.

7. An apparatus according to claim 4, wherein the signal to be input to said band-pass filter includes information associated with a displacement of a certain object.

8. A Doppler velocity meter comprising:

an illumination system for illuminating an object to be detected;

a photodetector for detecting light reflected by the object irradiated with said illumination system;

a band-pass filter for filtering an output signal from said photodetector, velocity information of the object being obtained from an output signal from said band-pass filter;

a deviation information detector for detecting deviation information of a frequency of a signal to be input to said band-pass filter or a signal output from said band-pass filter with respect to the center frequency of said bad-pass filter, the deviation information including at least a deviation direction; and a band-pass filter control system for changing the center frequency of said band-pass filter on the basis of a detection result of the deviation information including the deviation direction detected by said deviation information detector, thereby adjusting the center frequency of said band-pass filter to coincide with the frequency of the signal to be filtered through said band-pass filter, wherein said deviation information detector has a single detecting band-pass filter or a plurality of detecting band-pass filters, center frequencies of which are different from said center frequency of said band-pass filter, and wherein a signal to be input into said band-pass filter is also input into said single detecting band-pass filter or said plurality of band-pass filters, and wherein said deviation information is detected, in the case where a number of detection band-pass filters is one, by comparing output signals from said band-pass filter and said single detecting band-pass filter, and in the case where the number of detection band-pass filters is plural, by comparing output signals from at least two of said plurality of detecting band-pass filters.

* * * * *

UNITED STATES PATENT AND TRADEMARK OFFICE
CERTIFICATE OF CORRECTION

PATENT NO. : 5,696,578

DATED : December 9, 1997

INVENTOR(S): YASUHIKO ISHIDA ET AL.

Page 1 of 2

It is certified that error appears in the above-identified patent and that said Letters Patent is hereby corrected as shown below:

COLUMN 2

Line 12, "diagrams" should --diagram--.

COLUMN 3

Line 16, "main part" read --the main part--.

COLUMN 4

Line 27, "in" should read --on--;
Line 35, "in" should read --on--;
Line 67, "ZERO" should read --zero--.

COLUMN 5

Line 3, "ZERO" should read --zero--;
Line 12, "ZERO" should read --zero--;
Line 59, "same" should read --same as--.

COLUMN 6

Line 1, "ZERO" should read --zero.-- and "ZERO," should read --zero,--;
Line 4, "ZERO" should read --zero--; and "the each center frequency" should read --the center frequencies--;
Line 63, "main part" should read "the main part".

UNITED STATES PATENT AND TRADEMARK OFFICE
CERTIFICATE OF CORRECTION

PATENT NO. : 5,696,578

DATED      : December 9, 1997

INVENTOR(S): YASUHIKO ISHIDA ET AL.

It is certified that error appears in the above-identified patent and that said Letters Patent is hereby corrected as shown below:

<u>COLUMN 8</u>

Line 17, "in" should read --on--; "Fc" should read --$F_c$--; and "Fss" should read --$F_{ss}$--.

<u>COLUMN 10</u>

Line 33, "bad-pass" should read --band-pass--.

Signed and Sealed this

Sixteenth Day of June, 1998

Attest:

BRUCE LEHMAN

Attesting Officer

Commissioner of Patents and Trademarks